Figure 7:
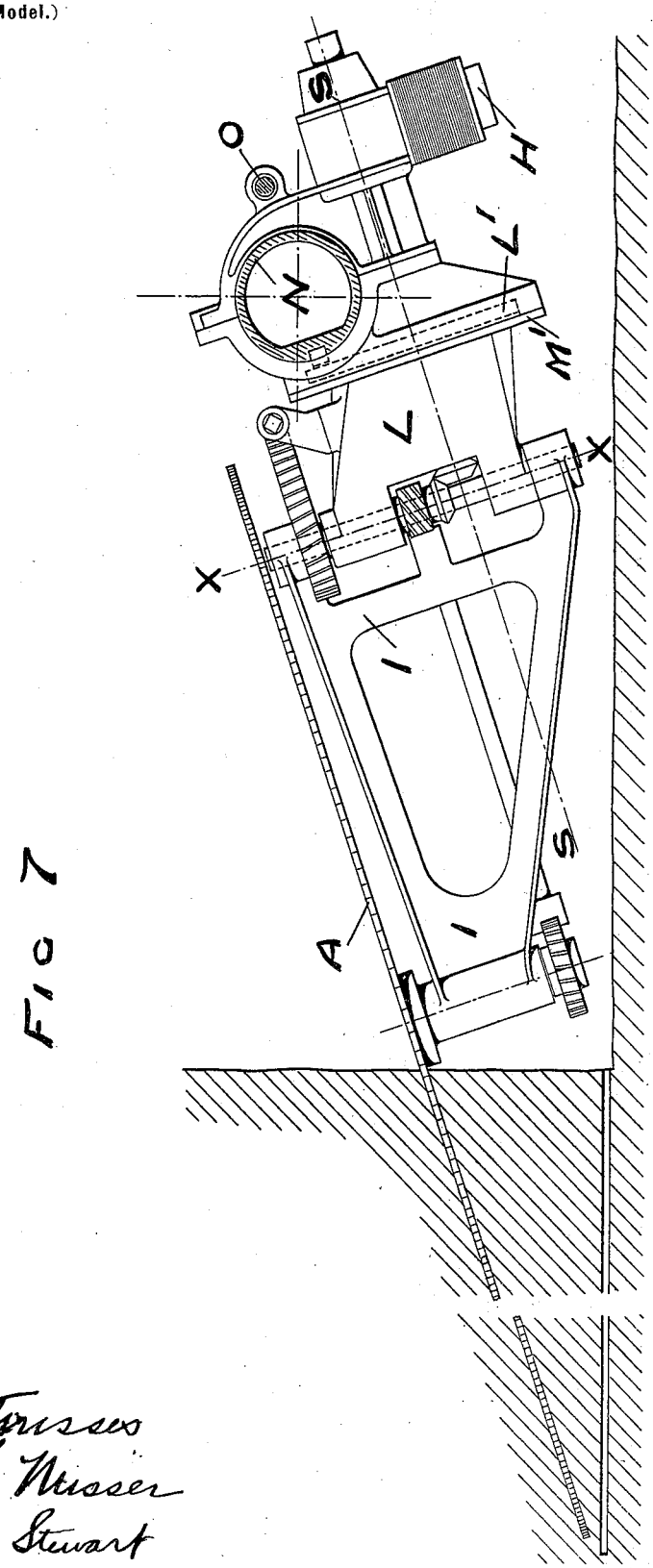

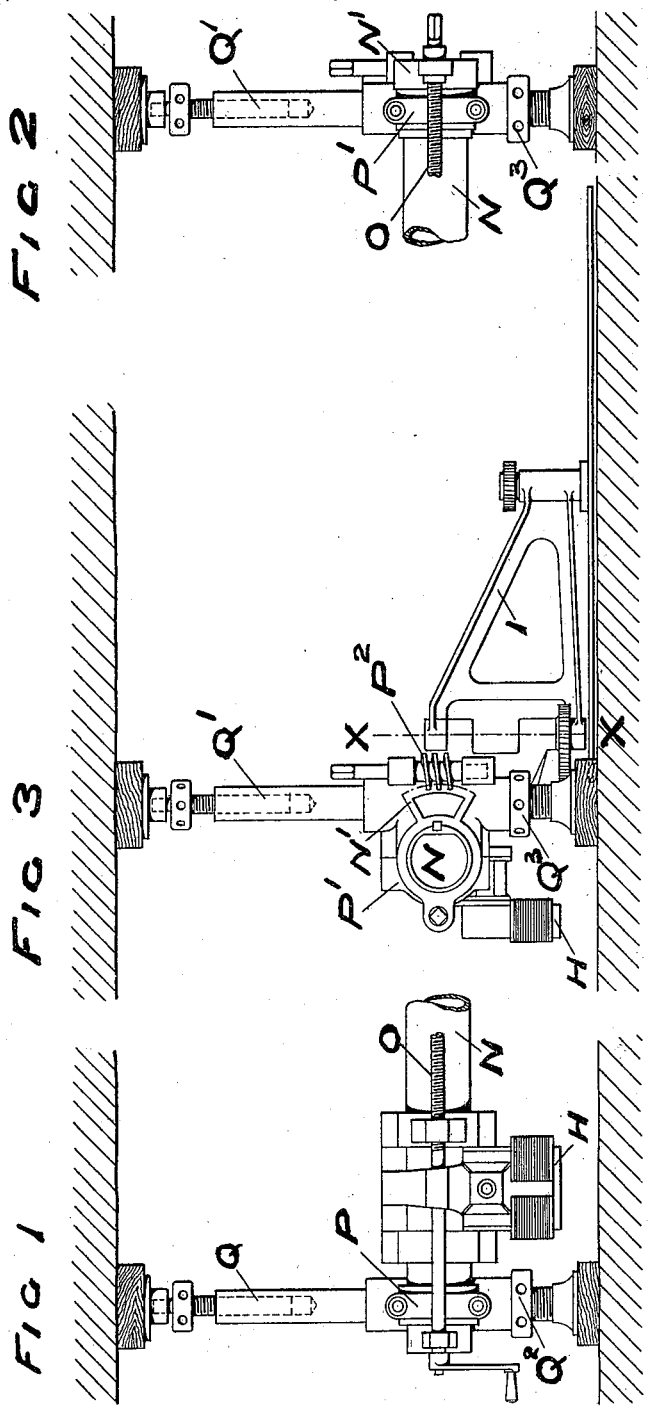

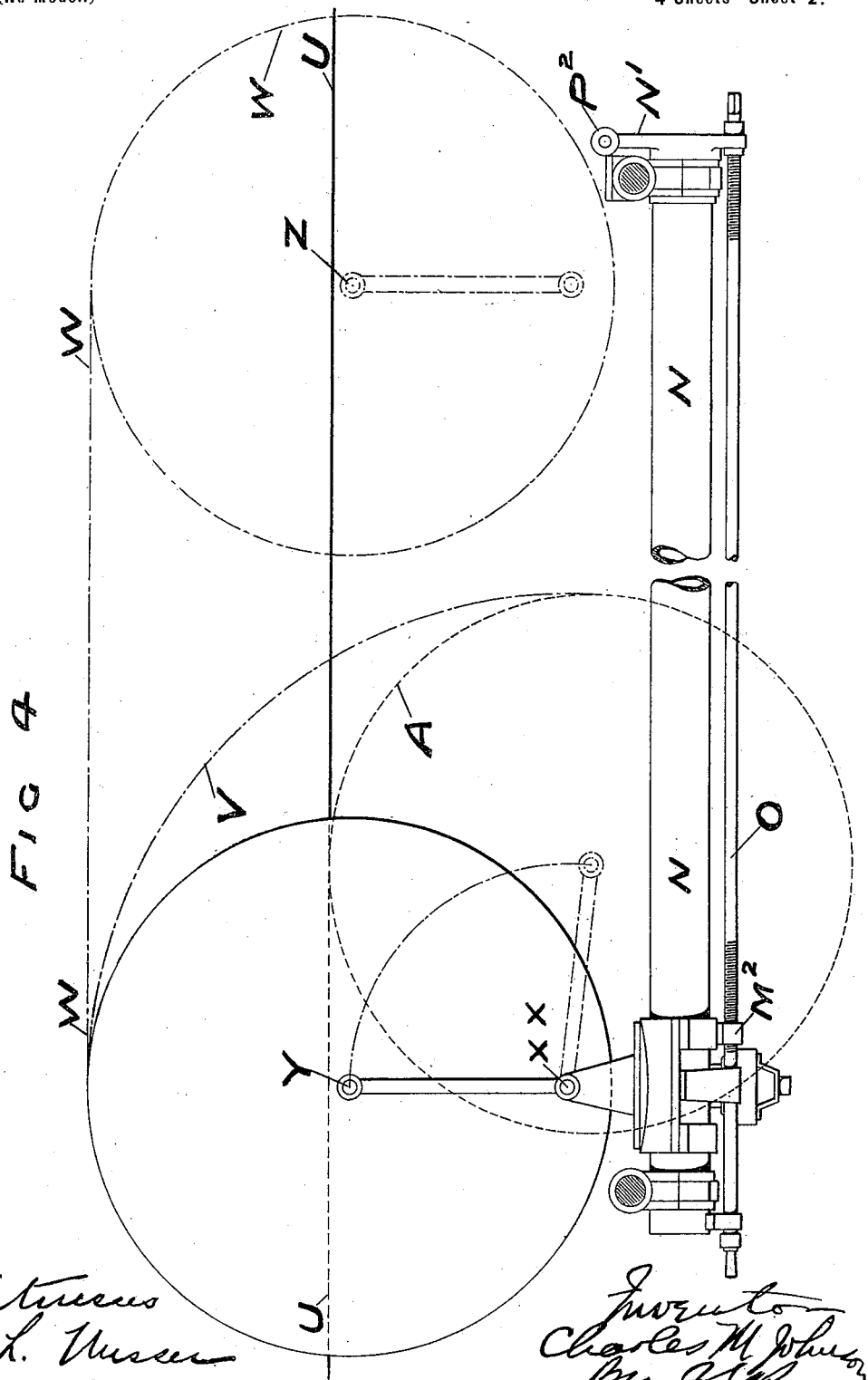

No. 628,007. Patented July 4, 1899.
C. M. JOHNSON.
COAL MINING MACHINE.
(Application filed Sept. 9, 1898.)
(No Model.) 4 Sheets—Sheet 3.
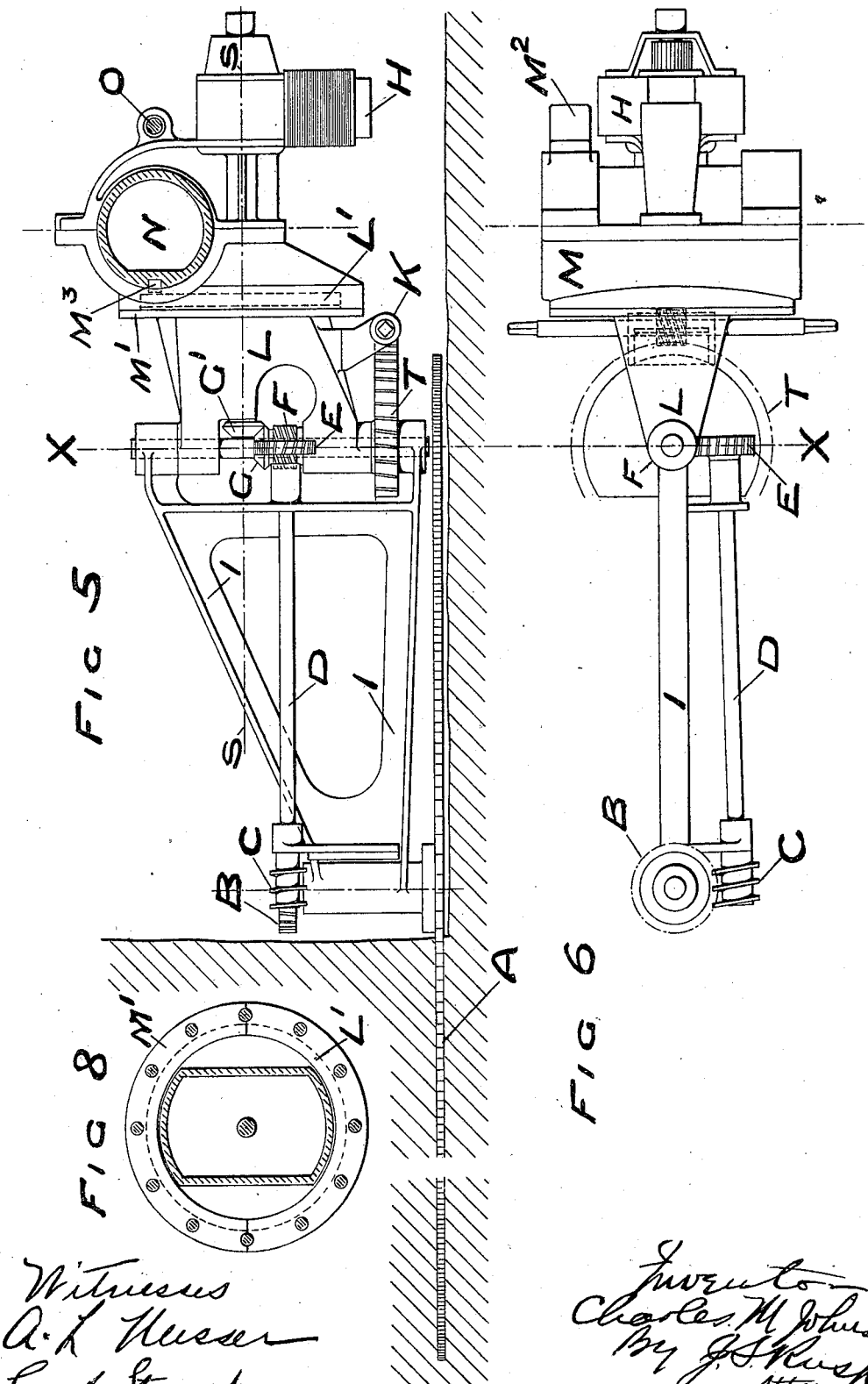

No. 628,007. Patented July 4, 1899.
C. M. JOHNSON.
COAL MINING MACHINE.
(Application filed Sept. 9, 1898.)
(No Model.) 4 Sheets—Sheet 4.

Witnesses
A. L. Misser
C. A. Stewart

Inventor
Charles M. Johnson
By J. A. Rusk
Atty

UNITED STATES PATENT OFFICE.

CHARLES M. JOHNSON, OF NEW YORK, N. Y.

COAL-MINING MACHINE.

SPECIFICATION forming part of Letters Patent No. 628,007, dated July 4, 1899.

Application filed September 9, 1898. Serial No. 690,580. (No model.)

*To all whom it may concern:*

Be it known that I, CHARLES M. JOHNSON, a citizen of the United States of America, and a resident of New York, State of New York, but temporarily residing in London, England, have invented a certain new and useful Improvement in Coal-Mining Machines, of which the following is a description.

This invention relates to coal-mining machinery, and has for its object to enable the coal removed in the operation of undercutting or "holding" to be obtained in large lumps in comparison with that removed when the same operation is performed by hand labor, and thereby save the cost of mining.

One way of operating this invention consists, essentially, in mounting a circular saw upon a jointed cantaliver-arm projected from a horizontal guide in such manner that the arm may be swung about an axis normal to the plane of the desired cut for the purpose of entering the saw and that the saw when so entered may be fed along the guide-bar in order to elongate the entering cut, and in an angular adjustment of the plane of the saw, so that with two cuts a wedge of coal is severed, the removal of which effects the operation of holding. The corners may be removed in any suitable manner, or, as I prefer, by a revolving core-drill.

Reference is to be had to the accompanying drawings, forming part of this specification, wherein—

Figures 1 and 2 are elevations, and Fig. 3 an elevation at right angles to Fig. 2. Fig. 4 is a plan. Figs. 5 and 7 are elevations, and Fig. 6 is a plan. Fig. 8 is a detail elevation, partly in section.

The same letters of reference denote like parts in all the figures.

Referring to Fig. 5, A is the saw, mounted on a spindle driven by worm C, gearing in wheel B, said worm receiving its motion by means of the shaft D, worm-wheel E, worm F, and miter-wheels G G', the latter being fast upon the prolonged shaft of the electric motor H, as therein shown. The part I of the cantaliver-arm is pivoted on the axis X, parallel to the axis of the saw. The axis X is also the axis of the miter-wheel G, so that the arm I may be vibrated while the saw is running. T is a worm-wheel segment fast on the arm I, driven by the worm K, whose shaft has square ends and may be rotated by means of ratchet hand-levers or other suitable means for the purpose of imparting angular movement to the saw and arm I. The portion L of the cantaliver immediately carrying the arm I is connected to the socket portion M by means of an external circular flange L' upon L, fitting in a recess concentric with the motor-shaft and retained therein by a split ring M', as shown also in Fig. 8, so that the arm I and the saw-spindle can be rotated about the axis of the motor-shaft. The whole of the cantaliver is supported by the circular beam N, along which it is traveled by means of the screw O, (see Fig. 1,) carried by the beam N and working in the nut $M^2$ of Fig. 4. The beam N has a key-groove along it, and in the part M of the cantaliver is a feather $M^3$ engaging therein, (see Fig. 5,) so that the arm cannot rotate about the beam N.

In Figs. 1 and 2 the beam N is supported in bearings P P', and in Fig. 3 P' having a worm $P^2$ mounted thereon and engaging in a worm-wheel segment N', fast upon the beam N, so that the angular position of the arm can be determined in a plane normal to the axis of the beam N. The bearings P P' are mounted upon the columns Q Q', Figs. 1 and 2, upon which they are free to slide, their position vertically being determined by the nuts $Q^2$ $Q^3$, screwed on the columns and upon which the bearings P P' rest. The columns Q Q' are fitted at their upper ends with screw-jack heads, so that they may be secured in a position by straining them between the floor and roof of the seam worked.

Fig. 5 shows the saw in position for making the lower cut and Fig. 7 shows its position in making the top cut.

In Fig. 7 the arm I is shown inverted from the position shown in Fig. 5 by its partial rotation about the axis S S of the motor-shaft upon the ring junction formed by the parts L' and M' of Fig. 5 (which may be locked in any desired position) and inclined and adjusted by the worm $P^2$ of Fig. 3 and worm-wheel segment of N', before mentioned.

Fig. 4 is a general plan of the apparatus adjusted for making the lower cut, showing the cantaliver at an extreme position on the supporting-bar N, the dotted circle A being the saw about to enter the face (represented by the line U U) and the dot-and-dash arc V the extreme line cut by the saw while swung upon the axis X X of Fig. 5, the line W W being the contour of the cut made while the saw travels from the position Y to the position Z.

In operation any convenient form of motor can be used, and the invention must not be restricted to coal-cutting alone, for it can be used for other mining or tunneling purposes, and the saws may be operated in a different manner without departing from the spirit of the invention.

Having now particularly described and ascertained the nature of my said invention and a manner in which the same may be performed, I declare that what I claim is—

1. In a mining-machine, the combination of a rotatable beam, a support movable longitudinally on said beam and adapted to be turned with the latter, a shaft journaled in said support, a motor carried by said support for rotating said shaft, a hinged arm connected with said support and rotatable about the axis of said shaft, a shaft forming the pintle connecting the members of said arm, a shaft carried at the free end of said arm, a cutter secured on the last-mentioned shaft, a shaft for conveying motion from the shaft journaled in the support to the shaft forming the pintle, and a shaft for conveying motion from the shaft forming the pintle to the shaft carrying the cutter.

2. In a mining-machine, the combination of a rotatable beam, a support movable longitudinally on said beam and adapted to be turned with the same, a hinged arm rotatably mounted on said support, a rotatable shaft forming the pintle connecting the members of said arm, a driven shaft journaled in said support for rotating said pintle, a cutter carried by said arm, and mechanism for conveying motion from said pintle to said cutter.

3. In a mining-machine, the combination of adjustable bearings, a beam journaled in said bearings, a worm-and-gear mechanism for turning said beam in said bearings, a support movable longitudinally on said beam and adapted to be turned with the same, an adjusting-screw carried by said bearings and engaging with said support to move the latter longitudinally on said beam, a hinged arm rotatably mounted on said support, a worm-and-gear mechanism for moving one of the members of said arm relatively to the other member, a cutter carried by said arm, and means for driving said cutter.

4. In a mining-machine, the combination of adjustable bearings, a beam journaled in said bearings, a worm-gear mechanism for turning said beam in said bearings, a support movable longitudinally on said beam and adapted to be turned with the same, a screw carried by said bearings and engaging with said support for moving the latter longitudinally on said beam, a driven shaft journaled in said support, a hinged arm rotatably mounted on said support, a shaft forming the pintle connecting the members of said arm and rotated by said driven shaft, a shaft journaled in the outer end of said arm, a cutter carried by said latter shaft, and a mechanism for conveying motion from said pintle to the shaft carrying the cutter.

In witness whereof I have hereto set my hand, this 19th day of August, 1898, in the presence of two subscribing witnesses.

CHARLES M. JOHNSON.

Witnesses:
F. ALFORD ARMSTRONG,
C. HADINGHAM.